United States Patent [19]

Okamoto et al.

[11] 4,166,702

[45] Sep. 4, 1979

[54] DEVICE FOR DETECTING A TONER CONCENTRATION IN A DEVELOPING SOLUTION

[75] Inventors: Toyoo Okamoto, Yokohama; Seiichi Miyakawa, Nagareyama, both of Japan

[73] Assignee: Ricoh Company, Ltd., Japan

[21] Appl. No.: 870,520

[22] Filed: Jan. 18, 1978

Related U.S. Application Data

[63] Continuation of Ser. No. 683,763, May 6, 1976, abandoned.

[30] Foreign Application Priority Data

May 12, 1975 [JP] Japan ................................ 50-56901

[51] Int. Cl.[2] ..................... G01N 21/22; G01N 21/26; G01N 1/10; G03D 13/00

[52] U.S. Cl. .................................... 356/440; 118/691; 250/576; 354/298; 355/10; 356/442; 356/246

[58] Field of Search ............... 356/181, 201, 208, 246; 250/573, 576; 354/298; 355/10; 118/646

[56] References Cited

U.S. PATENT DOCUMENTS

| | | | |
|---|---|---|---|
| 2,324,304 | 7/1943 | Katzman | 356/208 |
| 3,369,524 | 2/1968 | Fuhrer | 355/10 |
| 3,560,099 | 2/1971 | Boe et al. | 356/246 |
| 3,712,203 | 1/1973 | Kishi et al. | 355/10 |

*Primary Examiner*—Vincent P. McGraw
*Attorney, Agent, or Firm*—Guy W. Shoup; Gerard F. Dunne

[57] ABSTRACT

A device for detecting toner concentration in a developing solution for developing an electrostatic image includes a casing having a small drainage hole formed at a top portion thereof so that a certain amount of a developing solution will always be present in the casing even when a tank containing a major portion of the developing solution used is made empty for some reason. A lamp and a lightsensitive element are mounted in the casing at locations below the drainage hole so that they may remain submerged in the solution within the casing at all times, thereby to prevent toner particles in the solution from adhering to the active surface of the former and hence errors in the detection due to the adhesion of toner particles. Alternatively, a pair of light transmission members in the form of bundles of optical fibers may be submerged in the solution within the casing, instead of the lamp and element, in order to allow the latter to be disposed externally of the casing.

16 Claims, 3 Drawing Figures

DEVICE FOR DETECTING A TONER CONCENTRATION IN A DEVELOPING SOLUTION

This is a continuation of application Ser. No. 683,763 filed May 6, 1976, now abandoned.

BACKGROUND OF THE INVENTION

The present invention relates to devices for detecting the concentration of particles in a solution, and more particularly, to devices for detecting the concentration of toner in a solution used for developing an electrostatic latent image.

A known process for developing an electrostatic latent image formed by an electrophotographic process on an image carrier makes use of a developing solution comprising a dispersion in an electrically insulating mother liquor of toner particles which carry electric charges of polarity opposite from that of the charge which forms the latent image. The electrostatic interaction between the latent image and the charge carried by the toner particles causes the toner particles to be attach to the latent image, thus developing it. It will be thus understood that the toner content in the developing solution is gradually diminished as the developing step is repeated for successive latent images. It is therefore necessary to maintain the toner concentration of the developing solution in a proper range by replenishing the toner in order to assure a satisfactory developing result. Such control of the toner concentration requires an accurate detection of the toner concentration in the developing solution.

It is well known to utilize the scattering effect of light by the toner particles contained in the developing solution to detect the concentration of toner. Light may be transmitted through the developing solution and made impinge on a photosensitive element to determine the toner concentration in accordance with the intensity of the transmitted light. Specifically, a flow of a very thin line developing solution is formed by a nozzle, and a light source and photosensitive element are disposed on opposite sides of the film flow. Light is thus passed from the source through the film flow to impinge on the photosensitive element. With this technique, the developing solution may often splash or spray on the light source or the photosensitive element located in the vicinity of the film flow, and the toner particles contained in such a splash or spray may adhere to the light source or photosensitive element as the mother liquid evaporates. As the amount of toner adhering to these elements increases, the amount of light emanating from the light source and the amount of light sensed by the photosensitive element is interfered with. Consequently, the toner concentration in the developing solution is detected to be at a level higher than its actual value, thus presenting a problem in the control of the toner concentration. To overcome this difficulty, it has been proposed in the prior art to pass the developing solution through a flat glass tube with the light source and the photosensitive element located on opposing sides of the tube, or to submerge both the light source and the photosensitive element in developing solution contained in a tank. However, when the developing solution in such prior proposals is exhausted, the toner will be deposited on the inner wall of the glass tube in the former case, and on the light source and the photosensitive element in the latter case, again preventing a proper control of the toner concentration. Exhaustion of the developing solution in the tank often occurs when the replenishment of the developing solution is forgotten for a prolonged period of time, when the developing solution is drained therefrom in order to move the associated apparatus, or when the apparatus is stored in the factory after it manufacture and inspection.

SUMMARY OF THE INVENTION

It is an object of the present invention to provide a device for detecting concentration of toner in a developing solution which eliminates the abovementioned inconvenience.

The various features which characterize the present invention are pointed out with particularity in the claims annexed hereto. Other objects, features and advantages of the present invention will become apparent from the following detailed description and accompanying drawing of an illustrative embodiment of the present invention.

DETAILED DESCRIPTION OF THE INVENTION

Figure 1:
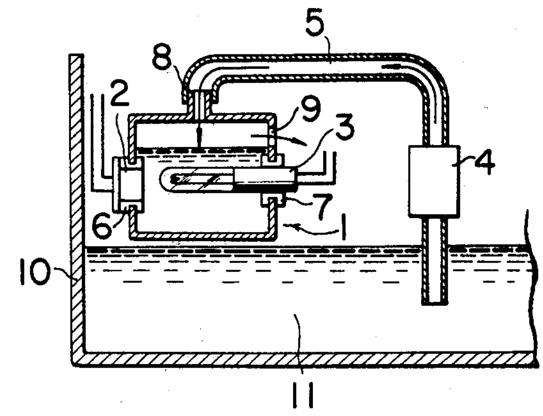
FIG. 1 is a schematic elevational section of a device which may be used to carry out the present invention.

The device shown in FIG. 1 apparatus in accordance with the invention. Specifically, the apparatus essentially comprises a casing 1 having a photosensitive element 2 and a light source or lamp 3 associated therewith, and a pump 4. The apparatus is fixedly mounted in a tank or reservoir 10 which contains a quantity of developing solution 11. The photosensitive element 2 and the lamp 3 are fitted into suitable openings formed in opposing sidewalls of the casing 1, so that the active surface or light receiving surface of the element 2 is located directly opposite the forward end or light emitting end of the lamp 3. Respective seals 6, 7 are provided between these elements and the sidewalls. In its top wall, the casing 1 is formed with an inlet port 8 which communicates with the pump 4 through a conduit 5. Adjacent to its top end, the casing 1 is also formed with a small drainage port 9.

In operation, the pump 4 is driven to pump developing solution 11 from the interior of the tank 10 into the interior of the casing 1 through the conduit 5. The pumped developing solution 11 fills the casing 1 and any overflow is drained through the hole 9 to be returned to the tank 10. As the lamp 3 is energized, light emanating therefrom transmits through quantity of the developing solution which fills the space between the lamp and the photosensitive element. In the course of its transmission, light is partially scattered by the toner particle contained in the developing solution. Light impinging on the photosensitive element 2 produces an electrical signal which depends on the intensity of the transmitted light. This electrical signal provides a measure of the toner concentration in the developing solution 11, and can be utilized to control the replenishment of the toner in a conventional manner.

In the event the developing solution 11 is entirely exhausted from the tank 10 for some reason as mentioned above, the developing solution which had been pumped into the interior of the casing 1 is substantially maintained therein after the operation of the pump 4 is interrupted, even though a very small proportion thereof may be drained through the hole 9. Since the hole 9 is located above the lamp 3 and the photosensitive element 2 as shown in FIG. 1, the active end faces of these components remain submerged in the developing solution maintained within the casing 1, and therefore the deposition of the toner thereon can be prevented. Of course, it is possible that the mother liquor of the developing solution contained within the casing 1 may evaporate and the resulting vapor escape through the hole 9, with consequence that the level of the developing solution within the casing 1 may sink below the active end faces of photosensitive element and lamp after a prolonged period of time to thereby cause a deposition of the toner particle thereon. However, this can be eliminated or minimized by reducing the size of the hole 9 and increasing the capacity of the casing 1. Alternatively, the hole 9 may be provided with a valve which shuts off the interior of the casing 1 from the exterior when a flow of the developing solution is interrupted. It is found that a suitable diameter for the hole 9 ranges from 2 to 5mm.

Figure 2:
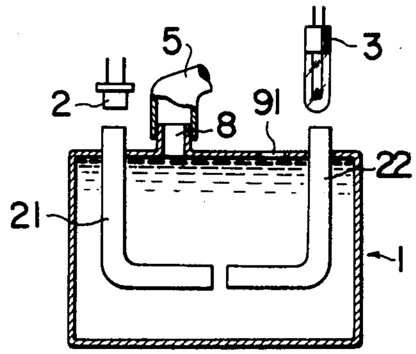
FIG. 2 is a schematic elevational section of a portion of a modification of the device shown in FIG. 1.

FIG. 2 shows a modification in which the photosensitive element 2 and the lamp 3 are located externally of the casing 1 rather than in the interior thereof. Specifically, a pair of L-shaped light conductive members 21, 22 in the form of bundles of optical fibres are mounted in the casing 1, with their one end of each bundle closely spaced from and opposite to an end of the other, and their other end located opposite to the photosensitive member 2 and the lamp 3, respectively. The inner end of the light conducting member 21 represents a light receiving end, and the inner end of the light conducting member 22 represents a light emitting end. In addition a small drainage hole 91 may be formed in the top wall of the casing 1, whereby a maximum quantity of developing solution can be stored in the interior of the casing 1 when a flow of the developing solution is interrupted. Since the communcation between the stored developing solution and the outer atmosphere is limited to the area of the small hole 91, the evaporation of the mother liquid of the developing solution which is stored in the casing 1 can be minimized.

Figure 3:
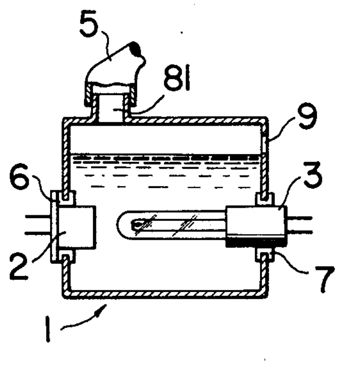
FIG. 3 is a schematic elevational section of a further device which may be used to carry out the present invention.

When there is no flow or movement of the developing solution within the casing 1, part of the toner particle in the developing solution which is stored within the casing 1 may deposit on the light emitting end and the light receiving end by sedimentation, but it can be detached therefrom by the stirring action which occurs as the developing solution again flows into the casing. However, it may be desirable to locate the inlet port 81 as illustrated in FIG. 3 such that a flow of the developing solution from the inlet port 81 directly passes between the oppositely located light emitting and light receiving ends. In this manner, both the light emitting and light receiving ends can be cleaned by a strong flow of the developing solution as the developing solution is fed into the casing 1. As will be appreciated, the light emitting and the light receiving end may alternatively be located relative to the inlet 8 so as to produce the similar effect. This has a secondary effect that a time lag is avoided which may be involved in the detection of the toner concentration of a fresh developing solution after the supply of the developing solution has been interrupted for a certain period of time. In such an instance, the toner concentration of a fresh developing solution may be different from the toner concentration of the developing solution which remains within the casing 1, and therefore it takes a certain length of time to detect the toner concentration of the fresh developing solution until the old developing solution within the casing 1 is replaced by the fresh developing solution, particularly when the casing 1 has an increased volume. However if the flow of the fresh developing solution is caused to flow through the space between the light emitting and the light receiving end, the toner concentration thereof can be immediately detected.

The light source may comprise an incandescent lamp or a light emitting diode. The casing may have any desired configuration.

What is claimed is:

1. A device for detecting the concentration of toner in a developing solution of a copying apparatus having a reservoir for containing a supply of developing solution, comprising a casing having an inlet port and an overflow port, means adapted to connect said inlet port with said reservoir for pumping developing solution into said casing, a light-emitting means disposed in said casing, a light-sensing means spaced from and facing said light-emitting means in said casing, whereby light from said light-emitting means can pass through developing solution in said space and onto said light-sensing means so as to enable a detection of the toner concentration of said solution, said overflow port being disposed in said casing above the level of said light-emitting element, said light-sensing element and said space therebetween.

2. A device according to claim 1, wherein said input port is disposed in said casing so as to direct developing solution toward said space between said light-emitting means and said light-sensing means.

3. A device according to claim 1, wherein said overflow port is 2 to 5 mm in diameter.

4. A device according to claim 1, wherein said overflow port has a one way flow valve biased to allow flow of developing solution from said casing to said reservoir.

5. A device according to claim 1, wherein said casing is diposed in said reservoir for direct flow of said developing solution from said overflow port to said reservoir.

6. A device according to claim 1, wherein said light-emitting and said light-sensing means comprise liquid-tight light source and liquid-tight sensor, immersed in developing solution in said casing.

7. A device according to claim 1, further comprising means including a valve in said overflow port for closing said overflow port when a flow of the developing solution through said pumping means is interrupted.

8. A device according to claim 1, said inlet port being located in the top wall of said casing, whereby the casing can be completely filled with developing solution so as to minimize evaporation thereof over extended periods of time.

9. A device according to claim 1, wherein said light-emitting means comprises a light-conducting fiber bundle having one end immersed in developing solution in said casing, and an opposite end facing a light source situated outside of said casing, and said light-sensing means comprises a second light-conducting fiber bundle having one end immersed in developing solution in said casing and an opposite end facing a light sensor situated outside said casing, said immersed fiber bundle ends being spaced from and facing each other in said casing.

10. A device according to claim 9, wherein said light source comprises an incandescent light.

11. A device according to claim 9, wherein said light source comprises a light-emitting diode.

12. A device according to claim 9, wherein said light sensor comprises a photoelectric cell.

13. A device according to claim 6, wherein said light source further comprises a light-emitting diode.

14. A device according to claim 6, wherein said light sensor further comoruses a photoelectric cell.

15. A device according to claim 6, wherein said light source further comprises an incandescent light.

16. A device for detecting the concentration of toner in a developing solution of a copying apparatus having a reservoir for containing developing solution, comprising:

a casing, means disposed in said casing for emitting light, means disposed in said casing for sensing light, said light-sensing means facing said light-emitting means with a space therebetween, means including an inlet port in said casing, for flowing developing solution from said reservoir into said casing, means including an outlet port in said casing for flowing developing solution from said casing back into said reservoir while continually holding in said casing a quantity of developing solution sufficient to keep said light-emitting means and said light-sensing means submerged even should said reservoir become empty of said developing solution.

* * * * *